US012791181B2

(12) United States Patent
Ling et al.

(10) Patent No.: US 12,791,181 B2
(45) Date of Patent: Nov. 10, 2026

(54) INTER-PLANT LAMP

(71) Applicant: Sunribio Co., Ltd., Shenzhen City (CN)

(72) Inventors: Jie Ling, Shenzhen City (CN); Bingbing Pan, Shenzhen City (CN)

( * ) Notice: Subject to any disclaimer, the term of this patent is extended or adjusted under 35 U.S.C. 154(b) by 0 days.

(21) Appl. No.: 19/424,619

(22) Filed: Dec. 18, 2025

(65) Prior Publication Data

US 2026/0210540 A1 Jul. 23, 2026

(30) Foreign Application Priority Data

Dec. 31, 2024 (CN) ......................... 202423319560.1

(51) Int. Cl.

| | |
|---|---|
| ***F21V 31/00*** | (2006.01) |
| ***A01G 7/04*** | (2006.01) |
| ***F21V 3/02*** | (2006.01) |
| ***F21V 17/16*** | (2006.01) |
| ***F21V 23/00*** | (2015.01) |
| ***F21V 23/02*** | (2006.01) |
| ***F21V 23/06*** | (2006.01) |
| ***F21V 29/83*** | (2015.01) |
| ***F21V 31/03*** | (2006.01) |

(52) U.S. Cl.

CPC ............ *F21V 31/005* (2013.01); *A01G 7/045* (2013.01); *F21V 3/02* (2013.01); *F21V 17/164* (2013.01); *F21V 23/001* (2013.01); *F21V 23/023* (2013.01); *F21V 23/06* (2013.01); *F21V 29/83* (2015.01); *F21V 31/03* (2013.01)

(58) Field of Classification Search

CPC .... A01G 7/04–045; A01G 9/249; F21V 3/02; F21V 17/00–18; F21V 23/00–06; F21V 29/50–83; F21V 31/00–03; Y02P 60/14

See application file for complete search history.

(56) References Cited

U.S. PATENT DOCUMENTS 7,936,561 B1 * 5/2011 Lin ......................... F21V 29/74 165/185

* cited by examiner

*Primary Examiner* — Jason M Han
(74) *Attorney, Agent, or Firm* — Sandy Lipkin

(57) ABSTRACT

The present invention provides an inter-plant lamp, comprising a lampshade, a radiator, a lamp board, a lamp post bracket, and a cascaded AC input terminal and a cascaded AC output terminal of lamp body. The radiator based on partition design increases the contact area with the air and enhances the heat dissipation capacity; the lamp board and power supply are tightly attached to the radiator to achieve efficient heat dissipation; The lampshade is snap-fitted with the radiator, and a sealing waterproof layer is provided to improve the drainage ability; the inclined angle of the lampshade is further optimized to 90 degrees to ensure that the interior of the lamp is dry and stable. The inter-plant lamp provided by the present invention not only improves the lighting effect on plants, but also brings better economic and social benefits to agricultural production, and therefore has broad market application prospects.

10 Claims, 5 Drawing Sheets

INTER-PLANT LAMP

REFERENCE TO PRIOR APPLICATION

This application claims priority to Chinese Patent Application 202423319560.1, filed on Dec. 31, 2024, which is incorporated herein by reference.

TECHNICAL FIELD

The present invention relates to the field of plant planting technology, particularly to the field of indoor plant supplementary lighting technology, and provides an inter-plant lamp.

BACKGROUND

With the continuous advancement of plant lighting technology, the application of inter-plant lamps in agricultural planting and other fields is becoming increasingly popular. However, there are many technical defects in the current market for inter-plant lamps, which seriously limit their performance and market competitiveness.

From the perspective of performance, the lack of waterproof and hydrophobic performance is the top priority. Many inter-plant lamps are not provided with effective waterproof measures, resulting in low drainage ability, and water easily enters the interior when the lamps are in a high humidity environment in the greenhouse or are threatened by water such as irrigation splashes, causing electrical component short circuits and corrosion that seriously endanger the normal operation of the lamps. Moreover, as the power of the lighting fixtures increases, the existing heat dissipation design becomes inadequate. Due to the inability to efficiently dissipate heat, the lamp sees a sharply rising internal temperature, which not only accelerates the decay of light source and reduces the color rendering index, but also has a negative impact on the performance stability of key components such as the power supply, resulting in a significant reduction in the luminous efficiency and reliability of the lamp. Furthermore, the existing inter-plant lamps have a single light distribution angle and lack a large angle emitting surface, making it difficult to cover the inter-plant space in all directions, resulting in uneven light reception of plants and inability to fully meet their photosynthetic needs.

In summary, given the significant deficiencies in performance and other aspects of existing inter-plant lamps, there is an urgent need for innovative technological solutions for optimization and improvement.

SUMMARY

The purpose of the present invention is to provide an inter-plant lamp that addresses the shortcomings of prior art, including poor hydrophobicity and heat dissipation, and a single light distribution angle.

The present invention provides an inter-plant lamp, comprising a lampshade, a radiator, and a lamp board;

- the lampshade is "A"-shaped as a whole, including two inclined surfaces disposed opposite to each other, the two inclined surfaces intersect at the top and extend downwards from the top to both sides, and the lower ends of the two inclined surfaces are provided with a first locking buckle, respectively;
- the radiator comprises a first heat dissipation zone and a second heat dissipation zone;

- the upper surface of the first heat dissipation zone matches the lower surface of the lampshade in terms of contour, and a second locking buckle is disposed at the lower edge of the first heat dissipation zone, along the length direction of the radiator;
- the lampshade is, from above, snap-fitted with the first heat dissipation zone, and the first locking buckle is snap-fitted with the second locking buckle, with a sealing waterproof layer at the snap-fit point;
- the lampshade is snap-fitted with the first heat dissipation zone to form a chamber that accommodates the lamp board, and the lamp board fits together closely with the surface of the first heat dissipation zone;
- after the lampshade is snap-fitted with the first heat dissipation zone, the radiator extends diagonally downwards along the direction of two inclined surfaces of the lampshade, forming the second heat dissipation zone; and
- the second heat dissipation zone is provided with a long through-hole.

The radiator of the present invention, when in use, is an integrated structure made of materials with good heat dissipation, which can effectively dissipate the heat generated by the lamp board.

The first heat dissipation zone is in full contact with the lamp board and dissipates heat. The second heat dissipation zone and long through-hole on the radiator increase the heat dissipation zone, so that air can more fully contact the surface of the radiator to accelerate heat exchange and quickly dissipate the heat generated by the lamp body into the air, effectively reducing the temperature of the lamp body, improving the heat dissipation efficiency and service life of the lamp, and avoiding problems such as performance degradation and component damage caused by overheating.

When the lampshade is fastened onto the first heat dissipation zone from above, the two inclined surfaces of the lampshade form an inclined surface with the second heat dissipation zone, which is a unique structural design that allows water falling on the lampshade to quickly flow away under the action of gravity. Preferably, when the angle between the two inclined surfaces of the lampshade is 90 degrees, the smoother water flow path can allow water to be more fully drained, reduce the residence time of water on the lampshade and radiator surface, and reduce the possibility of water entering the interior of the plant inter-plant lamp, thereby improving the overall waterproof performance, protecting the internal electronic components from water erosion, and ensuring that the plant inter-plant lamp can still work normally in humid environments.

In addition, the sealing waterproof layer disposed at the joint of the first locking buckle and second locking buckle further enhances the waterproof ability of the inter-plant lamp, effectively preventing moisture from seeping into the interior from the joint, providing dual waterproof protection for the lamp. The sealing waterproof layer is preferably applied to the second locking buckle with flowing transparent adhesive after the first locking buckle and the second locking buckle are fastened, sealing the gap between the lampshade and the radiator.

In further, the lamp board comprises a first lamp board and a second lamp board;

- an accommodating chamber is formed between the two inclined surfaces of the lampshade and the first heat dissipation zone;
- the first lamp board and the second lamp board are disposed in the accommodating chamber and fixedly connected to the first heat dissipation zone.

The lamp board, when in use, consists of a first lamp board and a second lamp board, which are respectively placed in the accommodating chambers on the inclined surface formed by the lampshade and the first heat dissipation zone. This unique layout allows light to spread to a wider range of angles according to the inclined structure of the lampshade, and breaks through the limitations of traditional lamps emitting light in a single direction to present high angle light emission, providing plants with multi angle lighting, improving light utilization, promoting all-round light growth of plants, and solving the problem of insufficient high angle lighting in traditional lamps. The lampshade is preferably made of high transparency material.

In further, the radiator extends vertically downwards from the connection part between the first heat dissipation zone and the second heat dissipation zone, forming a third heat dissipation zone; the third heat dissipation zone comprises two vertical planes facing each other, and an accommodating space is defined between the two planes; a third locking buckle is provided at the lower end of the third heat dissipation zone.

When in use, the third heat dissipation zone includes two vertical planes, which significantly increase the contact area between the heat dissipation zone and the air and accelerate heat dissipation; The third heat dissipation zone defines an accommodating space between the two planes, providing possibilities for heat dissipation and circuit layout of other components, optimizing the internal structure, and laying the foundation for the internal shared radiator of inter-plant lights; the third locking buckle is preferably disposed along the length direction of the radiator to provide a connection point for other external devices, and the position of the connection point is optional.

In further, the inter-plant lamp provided by the present invention further comprises a lamp post bracket, wherein the lamp post bracket comprises a sequentially connected flange nut, an elastic buckle, and a bracket; the buckle is structurally compatible with the third locking buckle, and the buckle engages with the third locking buckle to achieve a detachable connection between the lamp post bracket and the radiator.

When in use, the elastic buckle is compatible with the third locking buckle, and the elastic deformation of elastic buckle allows for quick clamping and disassembly, providing a detachable connection between the lamp post bracket and the radiator. When it is necessary to repair, replace parts, or adjust the position of the lighting fixture, simply pressing or pulling the elastic buckle lightly, instead of using complex tools can quickly remove the lamp post bracket from the radiator, making the operation simple and convenient; the third locking buckle is disposed along the length direction of the radiator, and the position of the lamp post bracket can be flexibly adjusted as needed; the number of lamp post supports can also be flexibly increased or decreased, according to different needs, to adapt to different scenarios.

In further, the inter-plant lamp provided by the present invention further comprises a power supply component disposed in the accommodating space of the third heat dissipation zone, and the power supply component further comprises a power supply, a power supply metal nut, a ventilation valve, a blind rivet, and a power supply waterproof pad; one end of the power supply is fixedly connected to the radiator through the power waterproof pad and the blind rivet, and the opposite end is fixedly connected to the radiator through the ventilation valve and the power supply metal nut, forming an atmospheric pressure equilibrium structure between the lamp chamber and the outside; the power supply and the radiator fit together closely with each other.

When in use, the power supply is fixedly connected to the radiator, and the outer surface of the power supply is in contact with the inner surface of the radiator, and the heat generated during operation can be quickly conducted to the radiator and dissipated into the surrounding air, maintaining the normal operating temperature of the power supply. At the same time, the third heat dissipation zone is composed of two vertical planes and is located below the first heat dissipation zone, and the special position and structure create a relatively enclosed space on both sides and above, effectively blocking external moisture from entering, thereby preventing faults such as short circuits and leakage, ensuring power safety, and providing continuous and stable protection for plant lighting.

The inter-plant lamp provided in the embodiment of the present invention is designed with a partitioned radiator and a long through hole on the second heat dissipation zone to increase the contact area between the radiator and the air. The surface of the lamp board and power supply is closely adhered to the surface of radiator to effectively conduct and dissipate the heat generated by the power supply and lamp board and maintain a suitable working temperature, ensuring stable performance of the lamp, extending its service life, and ensuring that plants continue to receive stable lighting. The sealing waterproof layer set at the junction of the first locking buckle and second locking buckle seals the gap between the lampshade and the radiator, effectively preventing external moisture from entering the interior of the lamp. Moreover, the angle between the two inclined surfaces of the lampshade is preferably 90 degrees, so that water falling on the lampshade can fully flow away along the inclined surface to avoid the infiltration of accumulated water into the interior of the lamp, ensure the dryness of the lamp interior, and reduce electrical failures caused by water ingress, providing a solid guarantee for the stable plant lighting. The shape of lampshade and the layout of light source are optimized to allow the light to diverge at large angles, to expand the coverage of the light, reduce blind spots and, furthermore, can improve the yield and quality of plants, bringing better economic and production benefits.

LABEL DESCRIPTION

1. Lampshade, 2. radiator, 3. Lamp board, 4. Lamp pole bracket, 5. AC input terminal of lamp body, 6. AC output terminal of lamp body, 7. Grounding wire assembly of lamp body, 8. Power supply assembly, 11. First locking buckle, 21. First heat dissipation zone, 22. Second heat dissipation zone, 23. Third heat dissipation zone, 31. First lamp board, 32. Second lamp board, 41. Flange nut, 42. Buckle, 43. Bracket, 51. AC input terminal male plug wire, 52. Input terminal silicone plug, 53. Input terminal sheet metal plug, 54. Input terminal screw, 61. AC output terminal female plug wire, 62. Output terminal silicone plug, 63. Output terminal sheet metal plug, 64. Output terminal screw, 71. Grounding screw, 72. Grounding nut, 73. Grounding serrated gasket, 81. Power supply, 82. Power supply metal nut, 83. Ventilation valve, 84. Blind rivet, 85. Power supply waterproof pad, 211. Second locking buckle, 231. Third locking buckle, 511. Input terminal nut, 512. Input terminal waterproof pad, 521. Inner groove, 611. Output terminal waterproof pad, 612. Output terminal nut.

DETAILED DESCRIPTION OF EMBODIMENTS

The technical solutions in the embodiments of the present invention will be described clearly and completely in conjunction with the accompanying drawings of the present invention. Obviously, the embodiments described are merely a part of the embodiments, not all the embodiments, of the present invention. seatd on the embodiments of the present invention, all other embodiments obtained by those of ordinary skill in the art without creative work shall fall within the protection scope of the present invention.

FIG. 1 to 5 illustrate embodiments of the present invention.

Figure 1:
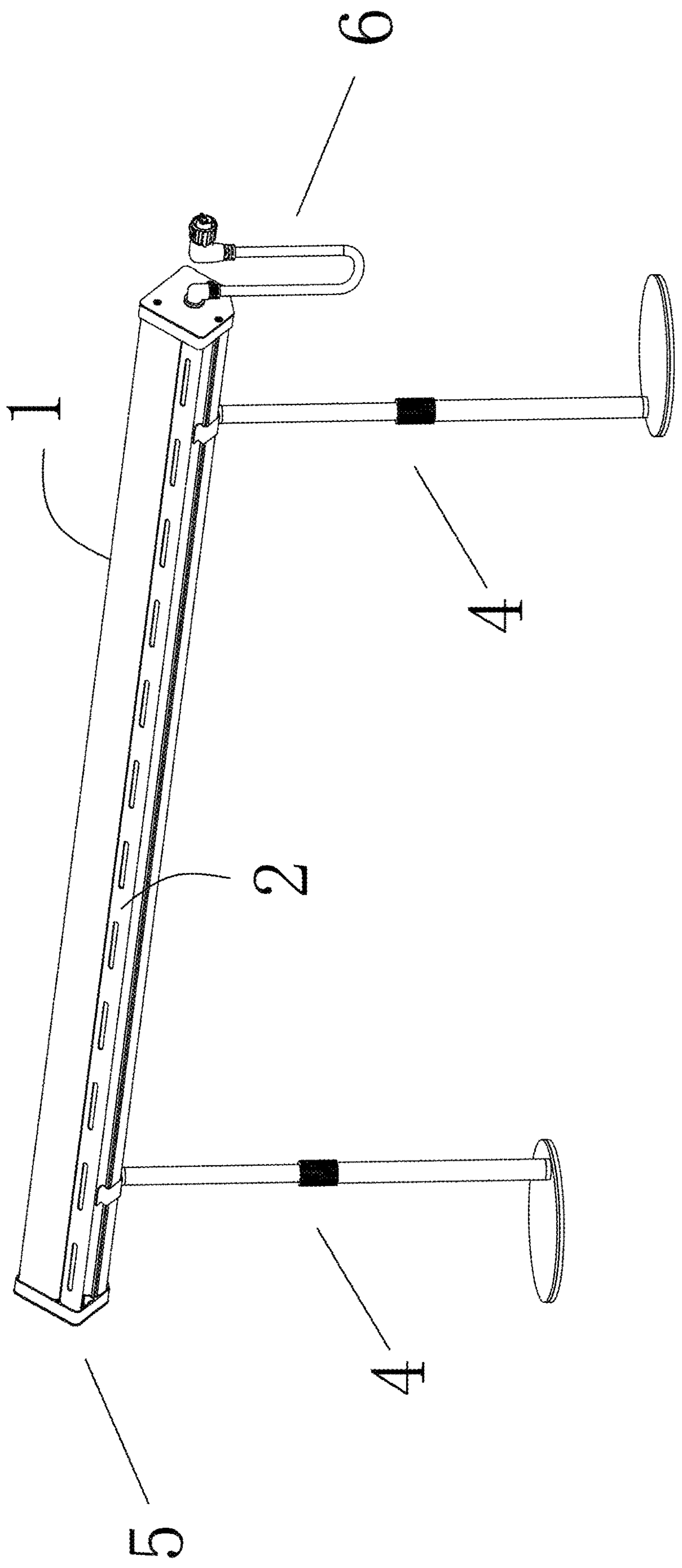
FIG. 1 is a schematic diagram of the overall structure of the inter-plant lamp provided by the present invention.
Figure 2:
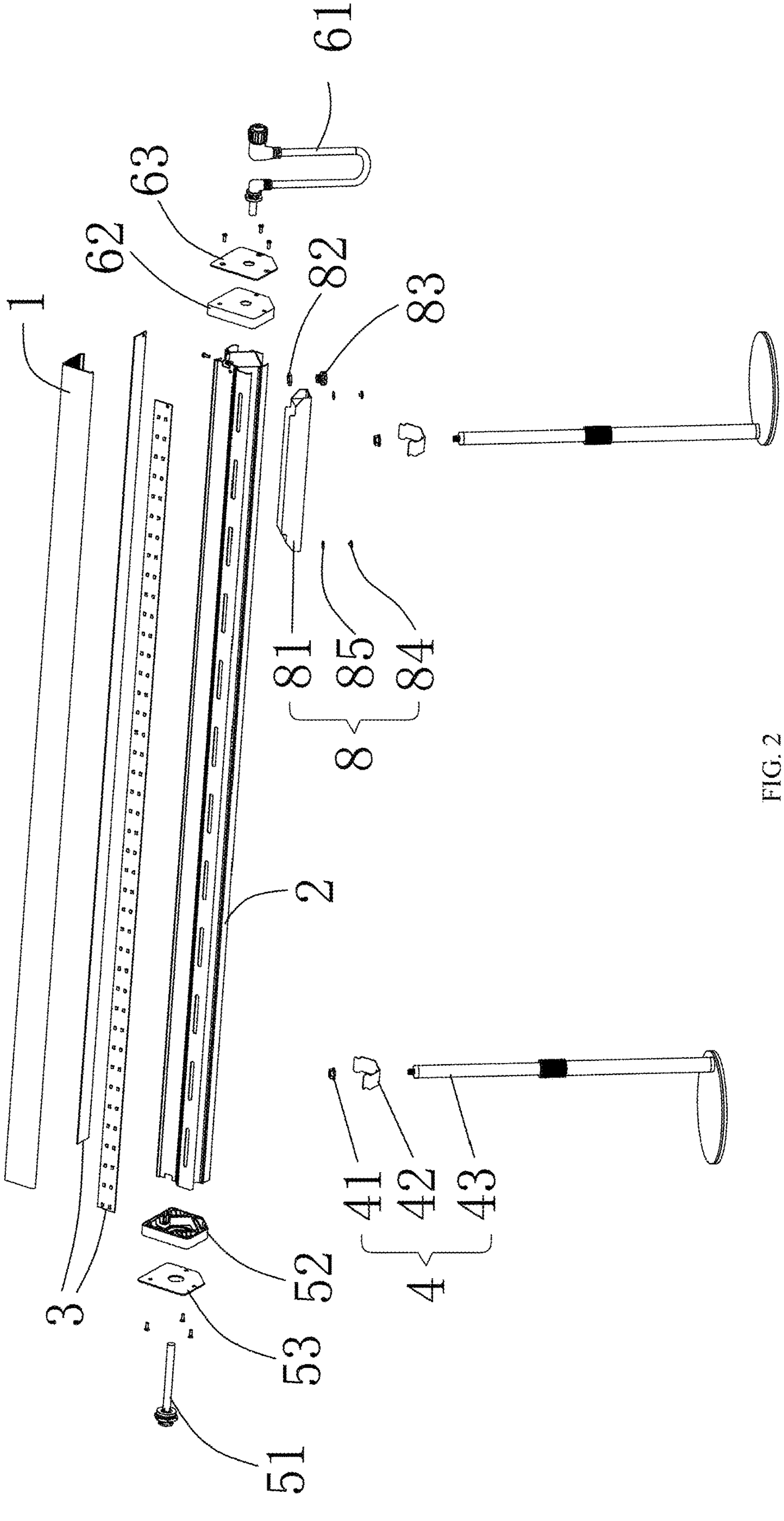
FIG. 2 is an exploded structural diagram of the inter-plant lamp provided by the present invention.

As shown in FIG. 1 and FIG. 2, the inter-plant lamp provided in the embodiments of the present invention comprises a lampshade 1, a radiator 2, and a lamp board 3;

the lampshade 1 is "A"-shaped as a whole, including two inclined surfaces disposed opposite to each other, the two inclined surfaces intersect at the top and extend downwards from the top to both sides, and the lower ends of the two inclined surfaces are provided with a first locking buckle 11, respectively;

the radiator 2 comprises a first heat dissipation zone 21 and a second heat dissipation zone 22;

the upper surface of the first heat dissipation zone 21 matches the lower surface of the lampshade 1 in terms of contour, and a second locking buckle 211 is disposed at the lower edge of the first heat dissipation zone 21, along the length direction of the radiator 2;

the lampshade 1 is, from above, snap-fitted with the first heat dissipation zone 21, and the first locking buckle 11 is snap-fitted with the second locking buckle 211, with a sealing waterproof layer at the snap-fit point;

the lampshade 1 is snap-fitted with the first heat dissipation zone 21 to form a chamber that accommodates the lamp board 3, and the lamp board 3 fits together closely with the surface of the first heat dissipation zone 21;

after the lampshade 1 is snap-fitted with the first heat dissipation zone 21, the radiator 2 extends diagonally downwards along the direction of two inclined surfaces of the lampshade 1, forming the second heat dissipation zone 22; and the second heat dissipation zone 22 is provided with a long through-hole.

The radiator 2 of the embodiment of the present invention, when in use, is a one-piece molding structure made of materials with good heat dissipation, which can effectively dissipate the heat generated by the lamp board.

The first heat dissipation zone 21 is in full contact with the lamp board 3 and dissipates heat. The second heat dissipation zone 22 and long through-hole on the radiator increase the heat dissipation zone, so that air can more fully contact the surface of the radiator 2 to accelerate heat exchange and quickly dissipate the heat generated by the lamp body into the air, effectively reducing the temperature of the lamp body, improving the heat dissipation efficiency and service life of the lamp, and avoiding problems such as performance degradation and component damage caused by overheating.

When the lampshade 1 is fastened onto the first heat dissipation zone 21 from above, the two inclined surfaces of the lampshade 1 form an inclined surface with the second heat dissipation zone, which is a unique structural design that allows water falling on the lampshade to quickly flow away under the action of gravity. Preferably, when the angle between the two inclined surfaces of the lampshade 1 is 90 degrees, the smoother water flow path can allow water to be more fully drained, reduce the residence time of water on the lampshade 1 and radiator 2 surface, and reduce the possibility of water entering the interior of the plant inter-plant lamp, thereby improving the overall waterproof performance, protecting the internal electronic components from water erosion, and ensuring that the plant inter-plant lamp can still work normally in humid environments.

In addition, the sealing waterproof layer disposed at the joint of the first locking buckle 11 and second locking buckle 211 further enhances the waterproof ability of the inter-plant lamp, effectively preventing moisture from seeping into the interior from the joint, providing dual waterproof protection for the lamp. The sealing waterproof layer is preferably applied to the second locking buckle 211 with flowing transparent adhesive after the first locking buckle 11 and the second locking buckle 211 are fastened, sealing the gap between the lampshade 1 and the radiator 2.

Figure 3:
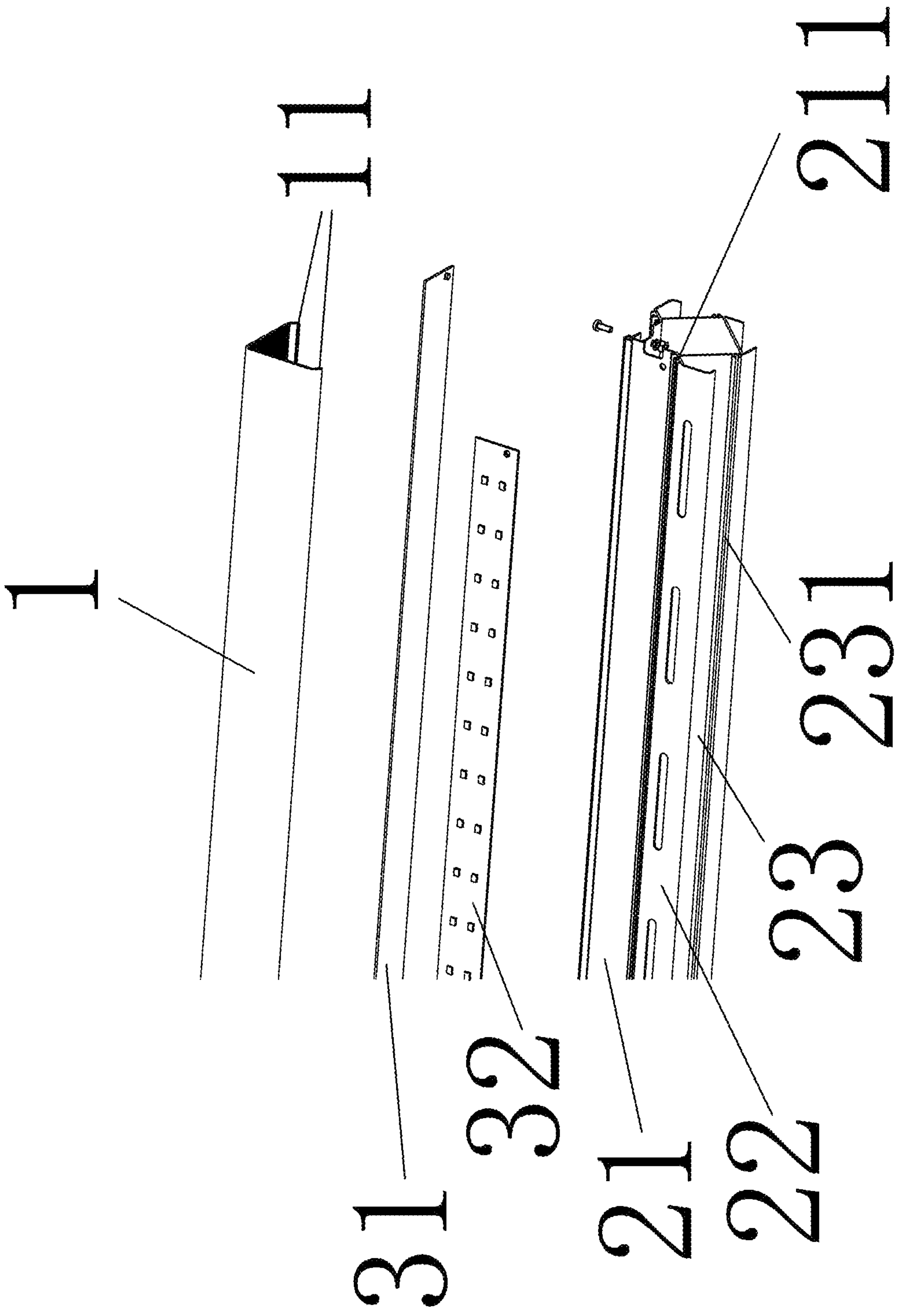
FIG. 3 is enlarged exploded diagram 1 of the inter-plant lamp provided by the present invention.

In further, as shown in FIG. 3, the lamp board 3 comprises a first lamp board 31 and a second lamp board 32;

an accommodating chamber is formed between the two inclined surfaces of the lampshade 1 and the first heat dissipation zone 21;

the first lamp board 31 and the second lamp board 32 are disposed in the accommodating chamber and fixedly connected to the first heat dissipation zone 21.

The lamp board 3, when in use, consists of a first lamp board 31 and a second lamp board 32, which are respectively placed in the accommodating chambers on the inclined surface formed by the lampshade 1 and the first heat dissipation zone 21. This unique layout allows light to spread to a wider range of angles according to the inclined structure of the lampshade, and breaks through the limitations of traditional lamps emitting light in a single direction to present high angle light emission, providing plants with multi angle lighting, improving light utilization, promoting all-round light growth of plants, and solving the problem of insufficient high angle lighting in traditional lamps. The lampshade 1 is preferably made of high transparency material.

In further, as shown in FIG. 3, the radiator 2 extends vertically downwards from the connection part between the first heat dissipation zone 21 and the second heat dissipation zone 22, forming a third heat dissipation zone 23; the third heat dissipation zone 23 comprises two vertical planes facing each other, and an accommodating space is defined between the two planes; a third locking buckle 231 is provided at the lower end of the third heat dissipation zone 23.

When in use, the third heat dissipation zone 23 includes two vertical planes, which significantly increase the contact area between the heat dissipation zone 2 and the air and accelerate heat dissipation; The third heat dissipation zone 23 defines an accommodating space between the two planes, providing possibilities for heat dissipation and circuit layout of other components, optimizing the internal structure, and laying the foundation for the internal shared radiator 2 of inter-plant lights; the third locking buckle 231 is preferably disposed along the length direction of the radiator 2 to provide a connection point for other external devices, and the position of the connection point is optional.

In further, as shown in FIG. 2, the inter-plant lamp provided in the embodiments of the present invention further comprises a lamp post bracket 4, wherein the lamp post bracket 4 comprises a sequentially connected flange nut 41, an elastic buckle 42, and a bracket 43; the buckle 42 is structurally compatible with the third locking buckle 231, and the buckle 42 engages with the third locking buckle 231 to achieve a detachable connection between the lamp post bracket 4 and the radiator 2.

When in use, the elastic buckle 42 is compatible with the third locking buckle 231, and the elastic deformation of elastic buckle 42 allows for quick clamping and disassembly, providing a detachable connection between the lamp post bracket 4 and the radiator 2. When it is necessary to repair, replace parts, or adjust the position of the lighting fixture, simply pressing or pulling the elastic buckle 42 lightly, instead of using complex tools, can quickly remove the lamp post bracket 4 from the radiator 2, making the operation simple and convenient; the third locking buckle 231 is disposed along the length direction of the radiator 2, and the position of the lamp post bracket 4 can be flexibly adjusted as needed; the number of lamp post supports can also be flexibly increased or decreased, according to different needs, to adapt to different scenarios.

Figure 4:
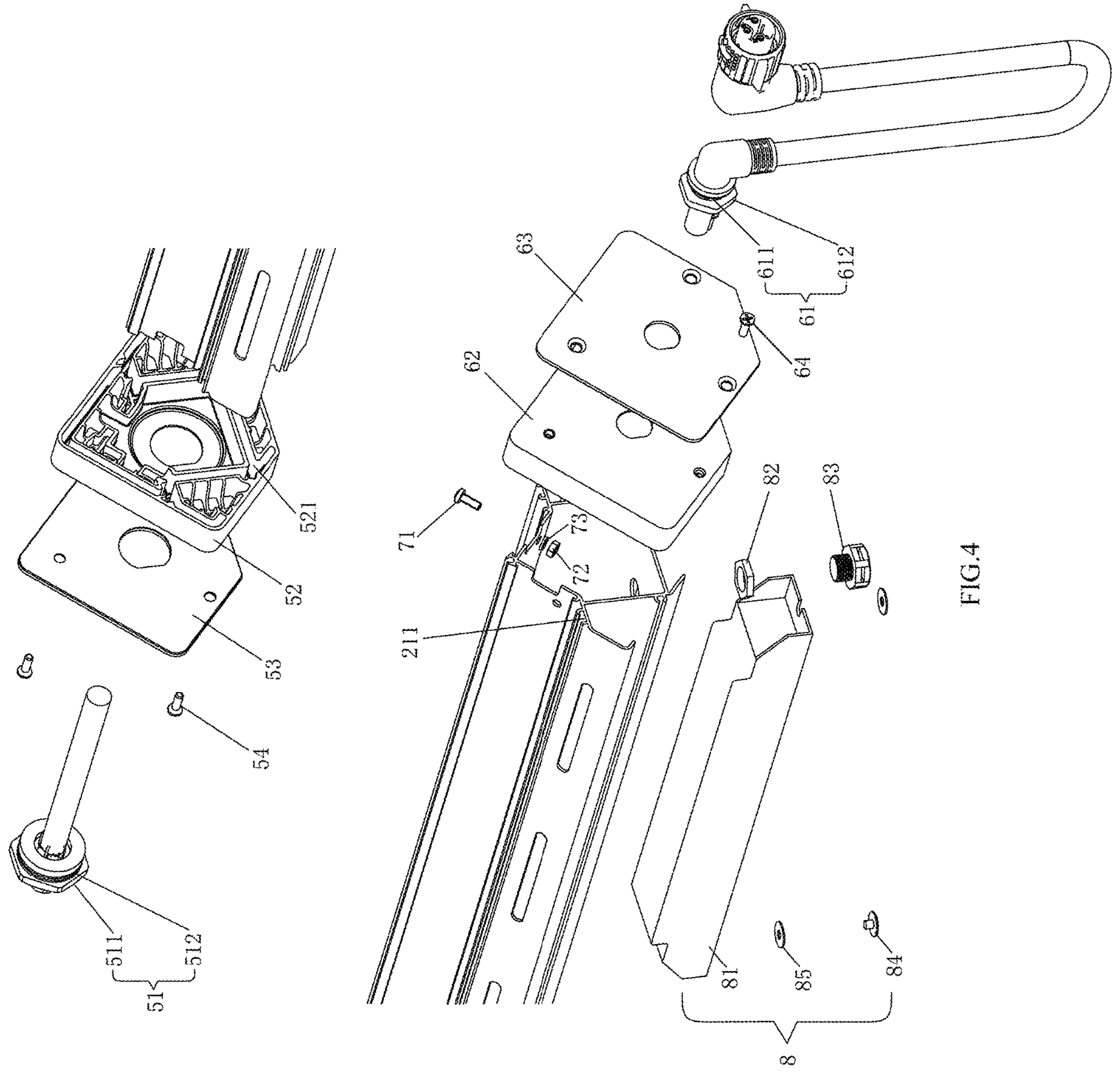
FIG. 4 is enlarged exploded diagram 2 of the inter-plant lamp provided by the present invention.

In further, as shown in FIG. 2 and FIG. 4, the inter-plant lamp provided in the embodiments of the present invention further comprises a power supply component 8 disposed in the accommodating space of the third heat dissipation zone 23, and the power supply component 8 further comprises a power supply 81, a power supply metal nut 82, a ventilation valve 83, a blind rivet 84, and a power supply waterproof pad 85; one end of the power supply 81 is fixedly connected to the radiator 2 through the power waterproof pad 85 and the blind rivet 84, and the opposite end is fixedly connected to the radiator 2 through the ventilation valve 83 and the power supply metal nut 82, forming an atmospheric pressure equilibrium structure between the lamp chamber and the outside; the power supply 81 and the radiator 2 fit together closely with each other.

When in use, the power supply 81 is fixedly connected to the radiator 2, and the outer surface of the power supply 81 is in contact with the inner surface of the radiator 2, and the heat generated during operation can be quickly conducted to the radiator 2 and dissipated into the surrounding air, maintaining the normal operating temperature of the power supply. At the same time, the third heat dissipation zone is composed of two vertical planes and is located below the first heat dissipation zone, and the special position and structure create a relatively enclosed space on both sides and above, effectively blocking external moisture from entering, thereby preventing faults such as short circuits and leakage, ensuring power safety, and providing continuous and stable protection for plant lighting.

In further, as shown in FIG. 1, FIG. 2 and FIG. 4, the inter-plant lamp provided in the embodiments of the present invention further comprises a lamp body AC input terminal 5, wherein the lamp body AC input terminal 5 comprises an AC input terminal male plug wire 51, an input terminal silicone plug 52, an input terminal sheet metal plug 53, and an input terminal screw 54; the AC input terminal male plug wire 51 is provided with an input terminal nut 511 and an input terminal waterproof pad 512; the input terminal silicone plug 52 and input terminal sheet metal plug 53 are sequentially nested in the corresponding positions of the AC input terminal male plug wire 51, the input terminal nut 511 fastens the AC input terminal male plug wire 51 to the input terminal silicone plug 52 and input terminal sheet metal plug 53, the input terminal screw 54 passes through the input terminal silicone plug 52 and input terminal sheet metal plug 53 and is threaded to the side end of the radiator 2, so that the input terminal silicone plug 52 and input terminal sheet metal plug 53 are fixed to the radiator 2, forming a stable connection structure.

In further, as shown in FIG. 4, the input terminal silicone plug 52 is provided with an inner groove 521, and a waterproof sealing structure is provided in the inner groove 521 to keep external moisture away from the radiator chamber.

In further, as shown in FIG. 1, FIG. 2 and FIG. 4, the inter-plant lamp provided in the embodiments of the present invention further comprises a lamp body AC output terminal 6, wherein the lamp body AC output terminal 6 comprises an AC output terminal female plug wire 61, an output terminal silicone plug 62, an output terminal sheet metal plug 63, and an output terminal screw 64; the AC output terminal female plug wire 61 is provided with an output terminal nut 612 and an output terminal waterproof pad 611; the output terminal silicone plug 62 and the output terminal sheet metal plug 63 are sequentially nested in the corresponding positions of the AC output terminal female plug wire 61, the output terminal nut 612 fastens the AC output terminal female plug wire 61 to the output terminal silicone plug 62 and the output terminal sheet metal plug 63, the output terminal screw 64 passes through the output terminal silicone plug 62 and the output terminal sheet metal plug 63 and is threaded to the side end of the radiator 2, so that the output terminal silicone plug 62 and the output terminal sheet metal plug 63 are fixed to the radiator 2, forming a stable connection structure.

When in use, the waterproof sealing structure in the inner groove 521 is an important defense line to prevent external water vapor from entering the radiator 2 chamber. The silicone plug itself has a certain degree of flexibility and adhesion, and the designed inner groove 521 further enhances its waterproof ability. The waterproof sealing structure can be made of, but not limited to, materials such as sealant or sealing pad, which are filled into the inner groove 521 and, after the components at the input terminal are assembled, can tightly adhere to the surfaces of adjacent components, filling any possible small gaps. In a humid environment, the rushing rainwater or the moisture in high humidity air, when coming into contact with the AC input terminal 5 of the lamp body, will be so effectively blocked by this waterproof sealing structure that they cannot enter the radiator chamber, ensuring a dry environment inside the lamp and the stable operation of the lamp.

The waterproof sealing structure of the AC output terminal 6 of the lamp body, which is the same as the technical solution of the AC input terminal 5 of the lamp body, will not be repeated here.

Figure 5:
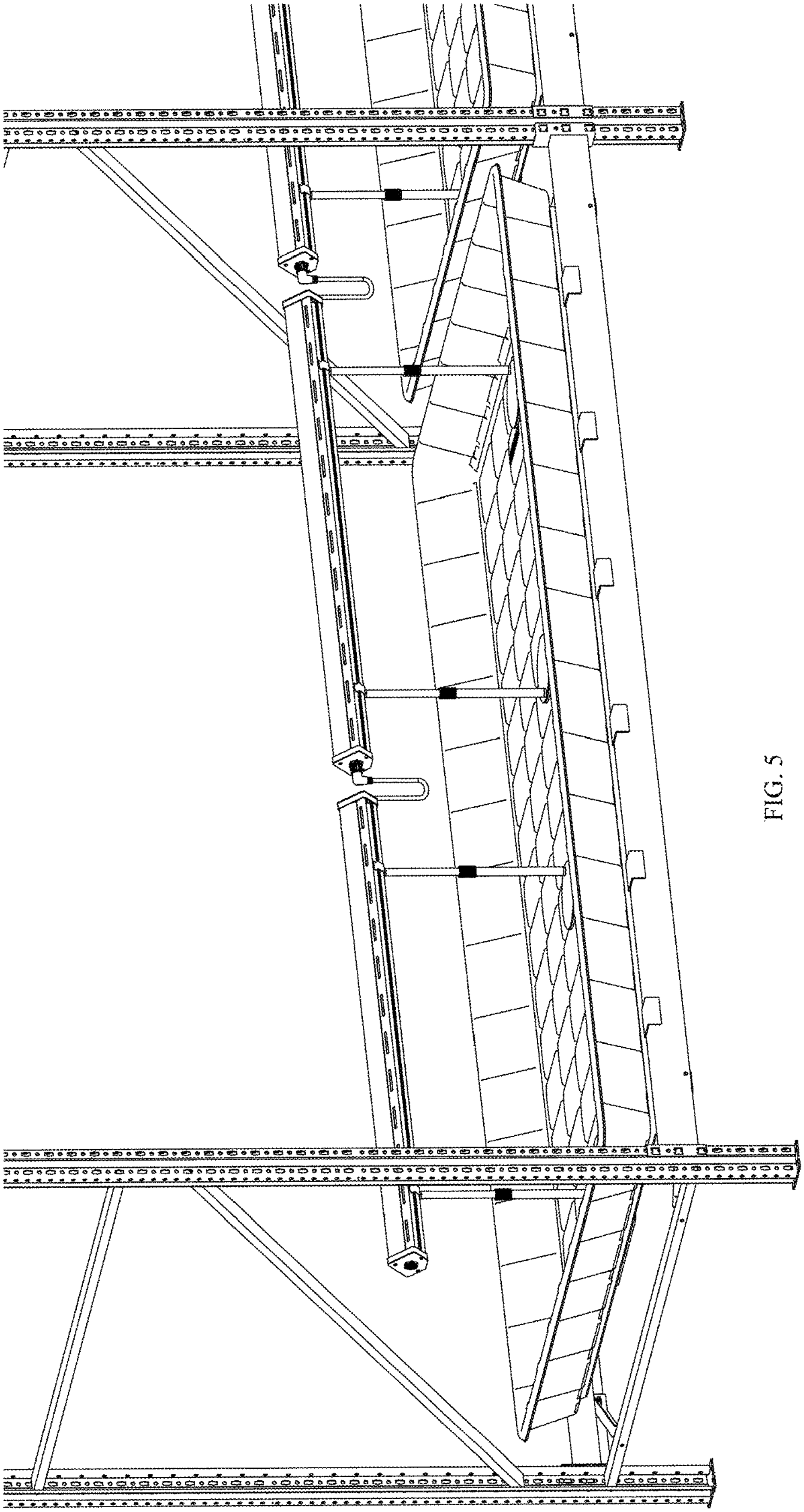
FIG. 5 is a schematic diagram of the cascading operation of the inter-plant lamp provided by the present invention.

In further, as shown in FIG. 1 and FIG. 5, the AC input terminal 5 of the lamp body and the AC output terminal 6 of the lamp body have an adaptive structure that cascades multiple lamp bodies.

When in use, in a large greenhouse, multiple inter-plant lamps are cascaded through the adaptive structure of the AC input and output terminals of the lamp body, simplifying the wiring. Only one main line needs to be connected from the power supply to the input terminal of the first lamp, and subsequent lamps are connected in sequence, avoiding the problems of complex wiring, high cost, and large space occupation caused by independent wiring of each lamp in the prior art. This solution reduces wiring costs and difficulties, reduces safety hazards, and makes lamp installation and management more convenient and efficient. In addition, cascading facilitates the unified control and management of parameters of multiple lighting fixtures, such as switches and brightness, meeting the specific lighting needs of plants at different growth stages.

In further, as shown in FIG. 4, the inter-plant lamp provided in the embodiments of the present invention further comprises a lamp body grounding wire assembly 7, wherein the lamp body grounding wire assembly 7 comprises a grounding screw 71, a grounding nut 72, and a grounding serrated pad 73; the grounding screw 71 passes through the grounding wire terminal set in the first heat dissipation zone 21 and the grounding serrated pad 73, and is threaded to the grounding nut 72, and a stable electrical connection is formed between the lamp body grounding wire assembly 7 and the first heat dissipation zone 21.

The inter-plant lamp provided in the embodiment of the present invention is designed with a partitioned radiator and a long through hole on the second heat dissipation zone to increase the contact area between the radiator and the air. The surface of the lamp board and power supply is closely adhered to the surface of radiator to effectively conduct and dissipate the heat generated by the power supply and lamp board and maintain a suitable working temperature, ensuring stable performance of the lamp, extending its service life, and ensuring that plants continue to receive stable lighting. The sealing waterproof layer set at the junction of the first locking buckle and second locking buckle seals the gap between the lampshade and the radiator, effectively preventing external moisture from entering the interior of the lamp. Moreover, the angle between the two inclined surfaces of the lampshade is preferably 90 degrees, so that water falling on the lampshade can fully flow away along the inclined surface to avoid the infiltration of accumulated water into the interior of the lamp, ensure the dryness of the lamp interior, and reduce electrical failures caused by water ingress, providing a solid guarantee for the stable plant lighting. Multiple inter-plant lamps are cascaded through the adaptive structure of the AC input and output terminals of the lamp body, simplifying the wiring.

In summary, the technical solution of the present invention overcomes the problems in the prior art, comprehensively improves the performance of inter-plant lamps in heat dissipation, hydrophobicity, and high angle luminescence, and provides a more outstanding solution for plant lighting.

It should be noted that the terms herein such as "up", "down", "left", "right", "inside", "outside", etc. indicate orientation or positional relationships based on the ones shown in the accompanying drawings, only for the convenience of describing the present invention and simplifying the description, and do not indicate or imply that the device or element referred to must have a specific orientation, be constructed and operated in a specific orientation, and therefore cannot be understood as a limitation on the present invention. In addition, relational terms such as "first" and "second" are only used to distinguish one entity or operation from another, and do not necessarily require or imply any actual relationship or order between these entities or operations, nor can they be understood as indicating or implying relative importance. Moreover, the term 'including' or any other variation thereof is intended to encompass non exclusive inclusion, such that a process, method, item, or terminal device that includes a series of elements includes not only those elements, but also other elements not explicitly listed, or elements inherent to such process, method, item, or terminal device.

The inter-plant lamp provided in the present application is described above in detailed. Specific examples are used herein to explain the principles and implementation methods of the present application. The above embodiments are only used to help understand the present application, and the content of the specification should not be understood as limiting the present application. Meanwhile, for general persons skilled in the art, there may be different forms of changes in the specific implementation methods and application scope according to the present application. It is here unnecessary and impossible to exhaustively list all the implementation methods, and the obvious changes or variations arising therefrom are still within the scope of protection of the present application.

What is claimed is:

1. An inter-plant lamp, comprising a lampshade (1), a radiator (2), and a lamp board (3);

the lampshade (1) is "A"-shaped as a whole, including two inclined surfaces disposed opposite to each other, the two inclined surfaces intersect at the top and extend downwards from the top to both sides, and the lower ends of the two inclined surfaces are provided with a first locking buckle (11), respectively;

the radiator (2) comprises a first heat dissipation zone (21) and a second heat dissipation zone (22);

the upper surface of the first heat dissipation zone (21) matches the lower surface of the lampshade (1) in terms of contour, and a second locking buckle (211) is disposed at the lower edge of the first heat dissipation zone (21), along the length direction of the radiator (2);

the lampshade (1) is, from above, snap-fitted with the first heat dissipation zone (21), and the first locking buckle (11) is snap-fitted with the second locking buckle (211), with a sealing waterproof layer at the snap-fit point;

the lampshade (1) is snap-fitted with the first heat dissipation zone (21) to form a chamber that accommodates the lamp board (3), and the lamp board (3) fits together closely with the surface of the first heat dissipation zone (21);

after the lampshade (1) is snap-fitted with the first heat dissipation zone (21), the radiator (2) extends diagonally downwards along the direction of two inclined surfaces of the lampshade (1), forming the second heat dissipation zone (22); and the second heat dissipation zone (22) is provided with a long through-hole.

2. The inter-plant lamp according to claim 1, wherein the lamp board (3) comprises a first lamp board (31) and a second lamp board (32);

an accommodating chamber is formed between the two inclined surfaces of the lampshade (1) and the first heat dissipation zone (21);

the first lamp board (31) and the second lamp board (32) are disposed in the accommodating chamber and fixedly connected to the first heat dissipation zone (21).

3. The inter-plant lamp according to claim 1, wherein the radiator (2) extends vertically downwards from the connection part between the first heat dissipation zone (21) and the second heat dissipation zone (22), forming a third heat dissipation zone (23); the third heat dissipation zone (23) comprises two vertical planes facing each other, and an accommodating space is defined between the two planes; a third locking buckle (231) is provided at the lower end of the third heat dissipation zone (23).

4. The inter-plant lamp according to claim 3, further comprising a lamp post bracket (4), wherein the lamp post bracket (4) comprises a sequentially connected flange nut (41), an elastic buckle (42), and a bracket (43); the buckle (42) is structurally compatible with the third locking buckle (231), and the buckle (42) engages with the third locking buckle (231) to achieve a detachable connection between the lamp post bracket (4) and the radiator (2).

5. The inter-plant lamp according to claim 4, further comprising a power supply component (8) disposed in the accommodating space of the third heat dissipation zone (23), and the power supply component (8) further comprises a power supply (81), a power supply metal nut (82), a ventilation valve (83), a blind rivet (84), and a power supply waterproof pad (85); one end of the power supply (81) is fixedly connected to the radiator (2) through the power waterproof pad (85) and the blind rivet (84), and the opposite end is fixedly connected to the radiator (2) through the ventilation valve (83) and the power supply metal nut (82), forming an atmospheric pressure equilibrium structure between the lamp chamber and the outside; the power supply (81) and the radiator (2) fit together closely with each other.

6. The inter-plant lamp according to claim 1, further comprising a lamp body AC input terminal (5), wherein the lamp body AC input terminal (5) comprises an AC input terminal male plug wire (51), an input terminal silicone plug (52), an input terminal sheet metal plug (53), and an input terminal screw (54); the AC input terminal male plug wire (51) is provided with an input terminal nut (511) and an input terminal waterproof pad (512); the input terminal silicone plug (52) and input terminal sheet metal plug (53) are sequentially nested in the corresponding positions of the AC input terminal male plug wire (51), the input terminal nut (511) fastens the AC input terminal male plug wire (51) to the input terminal silicone plug (52) and input terminal sheet metal plug (53), the input terminal screw (54) passes through the input terminal silicone plug (52) and input terminal sheet metal plug (53) and is threaded to the side end of the radiator (2), so that the input terminal silicone plug (52) and input terminal sheet metal plug (53) are fixed to the radiator (2), forming a stable connection structure.

7. The inter-plant lamp according to claim 6, wherein the input terminal silicone plug (52) is provided with an inner groove (521), and a waterproof sealing structure is provided in the inner groove (521) to keep external moisture away from the radiator chamber.

8. The inter-plant lamp according to claim 7, further comprising a lamp body AC output terminal (6), wherein the lamp body AC output terminal (6) comprises an AC output terminal female plug wire (61), an output terminal silicone plug (62), an output terminal sheet metal plug (63), and an output terminal screw (64); the AC output terminal female plug wire (61) is provided with an output terminal nut (612) and an output terminal waterproof pad (611); the output terminal silicone plug (62) and the output terminal sheet metal plug (63) are sequentially nested in the corresponding positions of the AC output terminal female plug wire (61), the output terminal nut (612) fastens the AC output terminal female plug wire (61) to the output terminal silicone plug (62) and the output terminal sheet metal plug (63), the output terminal screw (64) passes through the output terminal silicone plug (62) and the output terminal sheet metal plug (63) and is threaded to the side end of the radiator (2), so that the output terminal silicone plug (62) and the output terminal sheet metal plug (63) are fixed to the radiator (2), forming a stable connection structure.

9. The inter-plant lamp according to claim 8, wherein the AC input terminal (5) of the lamp body and the AC output terminal (6) of the lamp body have an adaptive structure that cascades multiple lamp bodies.

10. The inter-plant lamp according to any one of claims 1-9, further comprising a lamp body grounding wire assembly (7), wherein the lamp body grounding wire assembly (7) comprises a grounding screw (71), a grounding nut (72), and a grounding serrated pad (73); the grounding screw (71) passes through the grounding wire terminal set in the first heat dissipation zone (21) and the grounding serrated pad (73), and is threaded to the grounding nut (72), and a stable electrical connection is formed between the lamp body grounding wire assembly (7) and the first heat dissipation zone (21).

* * * * *